3,294,794
4-(2-ALKENOYL, OR 2 BROMOALKANOYL) MORPHOLINES

Raiford L. Holmes and Jerry P. Moreau, New Orleans, and Arthur F. Novak, Baton Rouge, La., assignors to the United States of America as represented by the Secretary of Agriculture
No Drawing. Filed Dec. 19, 1963, Ser. No. 331,977
6 Claims. (Cl. 260—247.7)

A non-exclusive, irrevocable, royalty-free license in the invention herein described, throughout the world for all purposes of the United States Government, with the power to grant sublicenses for such purposes, is hereby granted to the Government of the United States of America.

This invention relates to certain new derivatives of fatty acids, more particularly to the morpholides obtained by reacting morpholine with alpha,beta-unsaturated acids, with 2-bromodecanoic acid, and to propargyl 2-bromodecanoate. The compounds which are the subject of this invention are characterized by the fact that as growth inhibitors they are effective against a variety of pathogenic molds. The compounds which are the subject of this invention are:

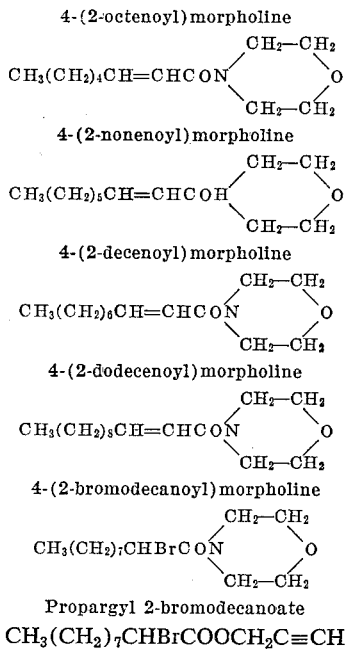

Propargyl 2-bromodecanoate $CH_3(CH_2)_7CHBrCOOCH_2C\equiv CH$

All of these new compounds were prepared by conventional methods, and the bioactivity of these was established by us in vitro, however, as will be obvious to those skilled in the art pertaining to the growth inhibition of molds, the compounds, besides being used as such, can for utilitarian purposes be formulated using a liquid, viscous, or solid diluent.

The diluent or extender must be inert with respect to the compound involved, and since this is the only significant requirement a wide variety of these agents is operable, among which are petroleum jellies, various alcohols and polyols, and vegetable oils.

In the case of intended use as fungicides in the protective coating composition art the compounds, subject of this invention, are compatible with conventional alkyds and with drying oil modified alkyds.

Specific examples showing the preparation of the new compounds being claimed are presented below along with tabulated data, which is submitted to establish the growth inhibiting properties of the claimed compounds.

The derivatives were screened for their antimicrobial activity against six pathogenic molds—*Candida wernecki, Keratinomyces ajelloi, Microsporum gypseum, Microsporum nanum, Trichophyton rubrum, Trichophyton tonsurans*, as illustrated in Table I.

Streaked and poured agar plates (Difco dehydrated mycological agar at pH 7.0) were used to measure the antimycotic activity against the molds. The streaked agar plates were prepared by streaking the hardened agar plates with the test mold, and the poured agar plates were prepared by pouring dilutions of mold spores over the hardened agar plates. The compounds were then added onto specified areas of these poured and streaked agar plates. Both the paper disc method and the addition of small quantities of the pure compound to the surface of the agar plates were used to evaluate these compounds.

To eliminate any error which could result from an insufficient number of tests, a minimum of three experiments employing duplicate plates was used for measuring the antimicrobial activity of each compound.

All test plates were incubated at the optimum growing temperature for each organism. The tabulated results which are illustrated in Table I were compiled from periodic readings obtained after incubation of 3, 5, and 7 days. Zones of inhibition were compared with those of the controls.

TABLE I

[The antimicrobial activity of morpholides of alpha, beta-unsaturated fatty acids and of propargyl 2-bromodecanoate]

| Compound | Antimicrobial Activity [a] Microorganisms[b] | | | | | |
|---|---|---|---|---|---|---|
| | A | B | C | D | E | F |
| 4-(2-octenoyl)morpholine | ++ | ++ | ++ | ++ | ++ | ++ |
| 4-(2-nonenoyl)morpholine | ++ | ++ | ++ | ++ | ++ | ++ |
| 4-(2-decenoyl)morpholine | + | ++ | ++ | ++ | ++ | ++ |
| 4-(2-dodecenoyl)morpholine | + | ++ | ++ | ++ | ++ | ++ |
| 4-(2-bromodecanoyl)morpholine | ++ | ++ | ++ | ++ | ++ | ++ |
| Propargyl 2-bromodecanoate | + | ++ | ++ | ++ | + | + |

[a] ++ = good; + = fair.
[b] A = *Microsporum gypseum*; B = *Trichophyton rubrum*; C = *Trichophyton tonsurans*; D = *Microsporum nanum*; E = *Keratinomyces ajelloi*; F = *Candida wernecki*.

Example 1

3.0 grams (0.019 mole) octenoyl chloride were dissolved in 40 ml. of ethyl ether. To this solution 3.0 grams (0.034 mole) morpholine were added dropwise with stirring. The stirring was continued for 2 hours at room temperature. The precipitate was removed by filtration and washed with ethyl ether. This filtrate was combined with the original filtrate, and the precipitate was discarded.

The ether solution, about 100 ml., was washed twice with 50 ml. of water, twice with 50 ml. of 1% HCl, once with 50 ml. of 1% NaOH, then to neutrality with water. The solution was dried with sodium sulfate, and the solvent evaporated to yield 3.2 grams of 4-(2-octenoyl)morpholine. The nitrogen content of the product was 6.0% (theoretical 6.6%).

Example 2

7.7 grams (0.04 mole) of nonenoyl chloride were reacted with 8 grams (0.09 mole) morpholine by the procedure of Example 1. The actual yield of 4-(2-nonenoyl) morpholine was 9.0 grams. The product had a nitrogen content of 5.9% (theoretical 6.2%).

Example 3

8.2 grams (0.043 mole) of decenoyl chloride were reacted with 8 grams (0.09 mole) morpholine by the procedure of Example 1. The actual yield of 4-(2-decenoyl)

morpholine was 9.4 grams. The product had a nitrogen content of 5.1% (theoretical 5.8%).

Example 4

7.4 grams (0.034 mole) of dodecenoyl chloride were reacted with morpholine by the procedure of Example 1. The actual yield of 4-(2-dodecenoyl)morpholine was 8.7 grams. The product had a nitrogen content of 5.7% (theoretical 5.2%).

Example 5

Ten grams of morpholine (0.11 mole) were dissolved in 75 ml. of benzene. To this solution 9.1 grams (0.028 mole) 2-bromodecanoyl bromide were added dropwise with stirring. The mixture was stirred for 1.5 hours, then refluxed for 1 hour and allowed to stand overnight. The precipitate was removed by filtration and washed with benzene. The combined filtrates were washed twice with equal volumes of water, once with 0.5 N hydrochloric acid, then with water to neutrality. The benzene solution was dried with sodium sulfate, filtered, and evaporated to dryness at 60° C. under aspirator vacuum to yield 7.4 grams of 4-(2-bromodecanoyl)morpholine. The product had a nitrogen content of 4.2% (theoretical 4.4%), and a bromine content of 25.1% (theoretical 25.0%).

Example 6

2-bromodecanoyl bromide was prepared from decanoic acid and bromine using phosphorus as a catalyst. It was then purified by distillation. 25 grams (0.08 mole) of 2-bromodecanoyl bromide were heated at reflux for 4 hours with 41.2 grams (0.74 mole) of propargyl alcohol. The alcohol was distilled off to yield 19.1 grams crude ester. The ester was distilled under reduced pressure to give 15.7 grams propargyl 2-bromodecanoate; boiling point 113–115 at 1 mm. The bromine content was 28.0% (theoretical 27.6%).

We claim:
1. 4-(2-octenoyl)morpholine.
2. 4-(2-nonenoyl)morpholine.
3. 4-(2-decenoyl)morpholine.
4. 4-(2-dodecenoyl)morpholine.
5. 4-(2-bromodecanoyl)morpholine.
6. A member selected from the group consisting of 4-(2-octenoyl)morpholine, 4-(2-nonenoyl)morpholine, 4-(2-decenoyl)morpholine, 4-(2-dodecenoyl)morpholine, and 4-(2-bromodecanoyl)morpholine.

References Cited by the Examiner

Novak et al.: J. Am. Oil Chemists' Society, vol. 38, pp. 321–4 (1961).

ALEX MAZEL, *Primary Examiner.*

HENRY R. JILES, *Examiner.*

J. TOVAR, *Assistant Examiner.*